US012803128B2

(12) United States Patent
Ikeda et al.

(10) Patent No.: US 12,803,128 B2
(45) Date of Patent: Nov. 17, 2026

(54) WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shuya Ikeda, Osaka (JP); Osamu Nakayama, Osaka (JP); Nobuyuki Matsumura, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 473 days.

(21) Appl. No.: 18/685,098

(22) PCT Filed: Aug. 25, 2022

(86) PCT No.: PCT/JP2022/032065
§ 371 (c)(1),
(2) Date: Feb. 20, 2024

(87) PCT Pub. No.: WO2023/037889
PCT Pub. Date: Mar. 16, 2023

(65) Prior Publication Data

US 2024/0347875 A1 Oct. 17, 2024

(30) Foreign Application Priority Data

Sep. 9, 2021 (JP) ................................ 2021-146624

(51) Int. Cl.
*H01M 50/519* (2021.01)
*H01M 50/505* (2021.01)
*H01M 50/516* (2021.01)

(52) U.S. Cl.
CPC ....... *H01M 50/519* (2021.01); *H01M 50/505* (2021.01); *H01M 50/516* (2021.01)

(58) Field of Classification Search
CPC .................................................. H01M 50/519
See application file for complete search history.

(56) References Cited

U.S. PATENT DOCUMENTS

| | | | | |
|---|---|---|---|---|
| 6,146,788 A * | 11/2000 | Ikeda | H01M 50/505 429/7 | |
| 2018/0166673 A1* | 6/2018 | Kataoka | H01M 10/4207 | |
| 2022/0410821 A1* | 12/2022 | Matsumura | H01M 50/503 | |

FOREIGN PATENT DOCUMENTS

| | | |
|---|---|---|
| JP | 11-120988 | 4/1999 |
| JP | 2016-115616 | 6/2016 |

(Continued)

OTHER PUBLICATIONS

International Search Report issued in WIPO Patent Application No. PCT/JP2022/032065, dated Nov. 15, 2022, along with an English translation thereof.

(Continued)

*Primary Examiner* — Stanley Tso
(74) *Attorney, Agent, or Firm* — Greenblum & Bernstein, P.L.C.

(57) ABSTRACT

A wiring module includes: a wire with a core wire; a wire relay member connected to the core wire; a busbar configured to be connected to electrode terminals; a circuit board provided with a conductive path, the conductive path including a first land electrically connected to the busbar and a second land electrically connected to the wire relay member, wherein the second land includes a connection land part, and (Continued)

a mounting land part includes a core wire connection part connected to the core wire and the connection land part with a first solder, and a mounting part connected to the mounting land part with a second solder, which is different from the first solder.

6 Claims, 17 Drawing Sheets

(56) References Cited

FOREIGN PATENT DOCUMENTS

| | | |
|---|---|---|
| JP | 2018-097987 | 6/2018 |
| KR | 10-2017-0131899 | 12/2017 |
| WO | 2021/124814 | 6/2021 |

OTHER PUBLICATIONS

Written Opinion issued in WIPO Patent Application No. PCT/JP2022/032065, dated Nov. 15, 2022.

* cited by examiner

WIRING MODULE

TECHNICAL FIELD

The technique disclosed in the present specification relates to a wiring module.

Battery packs for use in electric automobiles, hybrid automobiles and the like are provided with a plurality of electric cells, a plurality of busbars that connect electrodes of the plurality of electric cells, and a sensing module (wiring module) for sensing voltages and the like of the electric cells, the sensing module being electrically connected to the busbars. Such wiring module includes a fuse unit in which, for example, a busbar connection terminal connected to a busbar, a wire connection terminal connected to a terminal part of a wire, and a fuse connecting the busbar connection terminal and the wire connection terminal are formed as one piece (see Patent Document 1 below).

CITATION LIST

Patent Document

Patent Document 1: JP 2016-115616A

SUMMARY OF INVENTION

Technical Problem

In the above-described configuration, the fuse unit includes multiple components such as a synthetic resin housing that houses the busbar connection terminal, the wire connection terminal, and the fuse, thus causing a concern of a complicated configuration and an increase in manufacturing cost. In order to simplify the configuration of the wiring module and reduce the cost, it is conceivable to provide a circuit board that includes a conductive path with a land for busbars and a land for wires, and on which required electric components and the like are mounted, so that the busbars and the wires are connected to the respective lands. However, when the wire is directly connected to the land, there may be cases where due to, for example, floating of the wire from the land during soldering, connection strength cannot be ensured.

Solution to Problem

The wiring module disclosed in the present specification is directed to a wiring module configured to be attached to a plurality of power storage elements having electrode terminals, the wiring module including: a wire with a core wire; a wire relay member connected to the core wire; a busbar configured to be connected to the electrode terminals; and a circuit board provided with a conductive path, the conductive path including a first land electrically connected to the busbar and a second land electrically connected to the wire relay member, wherein the second land includes a connection land part, and a mounting land part disposed at a distance from the connection land part, and the wire relay member includes a core wire connection part connected to the core wire and the connection land part with a first solder, and a mounting part connected to the mounting land part with a second solder, which is different from the first solder.

Advantageous Effects of Invention

According to the wiring module disclosed in the present specification, it is possible to improve wire connection reliability.

DESCRIPTION OF EMBODIMENTS

Figure 1:
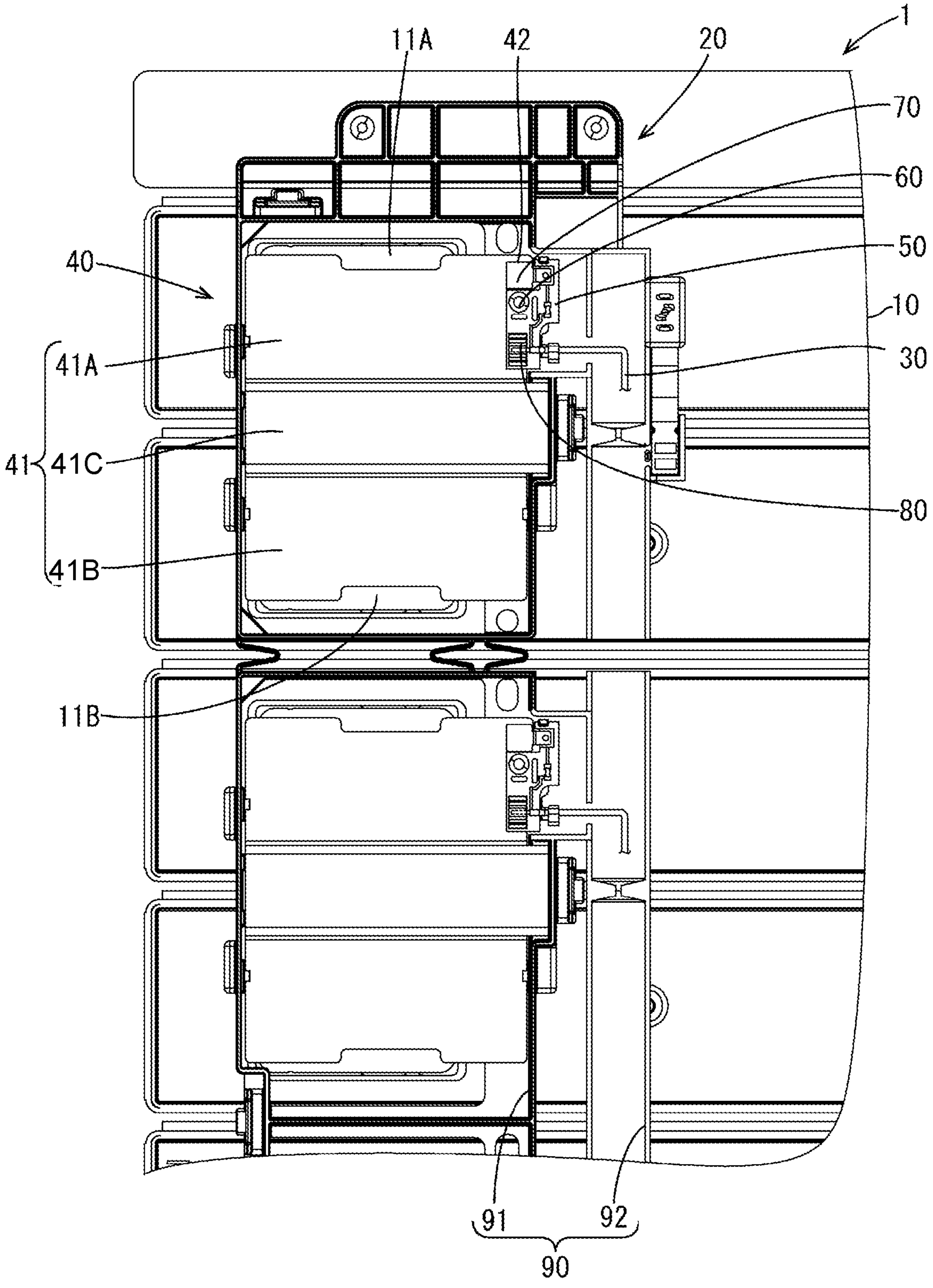
FIG. 1 is a partially enlarged plan view of a power storage module of Embodiment 1.

Overview of Embodiments (1) The wiring module disclosed in the present specification is directed to a wiring module configured to be attached to a plurality of power storage elements having electrode terminals, the wiring module including: a wire with a core wire; a wire relay member connected to the core wire; a busbar configured to be connected to the electrode terminals; and a circuit board provided with a conductive path, the conductive path including a first land electrically connected to the busbar and a second land electrically connected to the wire relay member, wherein the second land includes a connection land part, and a mounting land part disposed at a distance from the connection land part, and the wire relay member includes a core wire connection part connected to the core wire and the connection land part with a first solder, and a mounting part connected to the mounting land part with a second solder, which is different from the first solder.

With the above-described configuration, by connecting the core wire to the land via the wire relay member, the degree of freedom in design for improving the connection strength is increased compared to a case where the core wire is directly connected to the land, resulting in an improvement in the connection reliability of the wire. Also, the second land connected to the wire relay member includes the connection land part, and the mounting land part disposed at a distance from the connection land part, and the wire relay member includes the core wire connection part connected to the core wire and the connection land part with the first solder, and the mounting part connected to the mounting land part with the second solder, which is different from the first solder. This can avoid the first solder and the second solder, which have different compositions, from being mixed with each other and adversely affecting the electrical connection, making it possible to improve the connection reliability of the wire.

(2) In the wiring module according to the above-described item (1), the mounting land part may be disposed independently from the connection land part. Alternatively, the circuit board may include a resist that partially covers the second land, and the connection land part and the mounting land part may be separated from each other by the resist.

(3) In the wiring module according to the above-described item (1) or (2), the wire relay member may include a partitioning wall that stands upright from the core wire connection part and separates a space adjacent to the core wire connection part from the mounting land part, and the first solder may be disposed inside the space. With this configuration, it is possible to reliably avoid the first solder and the second solder from being mixed with each other and adversely affecting the electrical connection.

Details of Embodiments

The following describes specific examples of the technique disclosed in the present specification with reference to the drawings. Note that the present invention is not limited to the examples but is defined by the claims, and all modifications within the meaning and scope equivalent to the claims are intended to be included.

Embodiment 1

Embodiment 1 is described with reference to FIGS. 1 to 7. A power storage module 1 of the present embodiment is power source equipment that is used as a driving source for electric automobiles and hybrid automobiles, and includes, as shown in FIG. 1, a plurality of power storage elements 10 and a wiring module 20 connected to the power storage elements 10.

Power Storage Element 10

The power storage elements 10 are secondary batteries. As shown in FIG. 1, each power storage element 10 is flat rectangular solid as a whole, and includes two electrode terminals 11A and 11B disposed on one face. One of the two electrode terminals 11A and 11B serves as a positive electrode terminal 11A, and the other one is a negative electrode terminal 11B. The plurality of power storage elements 10 are lined up in a line. Two adjacent power storage elements 10 are lined up so that the electrode terminals 11A and 11B having different polarities are adjacent to each other, that is, the positive electrode terminal 11A of one power storage element 10 and the negative electrode terminal 11B of the other power storage element 10 adjacent to the one power storage element 10 are adjacent to each other.

Wiring Module 20

As shown in FIG. 1, the wiring module 20 includes a plurality of wires 30, a plurality of busbars 40, a plurality of circuit boards 50, a plurality of rivets 60 that respectively fix the circuit boards 50 to the busbars 40, a plurality of busbar relay members 70 that electrically connect the busbars 40 to the respective circuit boards 50, a plurality of wire relay members 80 that electrically connect the circuit boards 50 to the respective wires 30, and a holding member 90 that holds these members.

Wire 30

Figure 2:
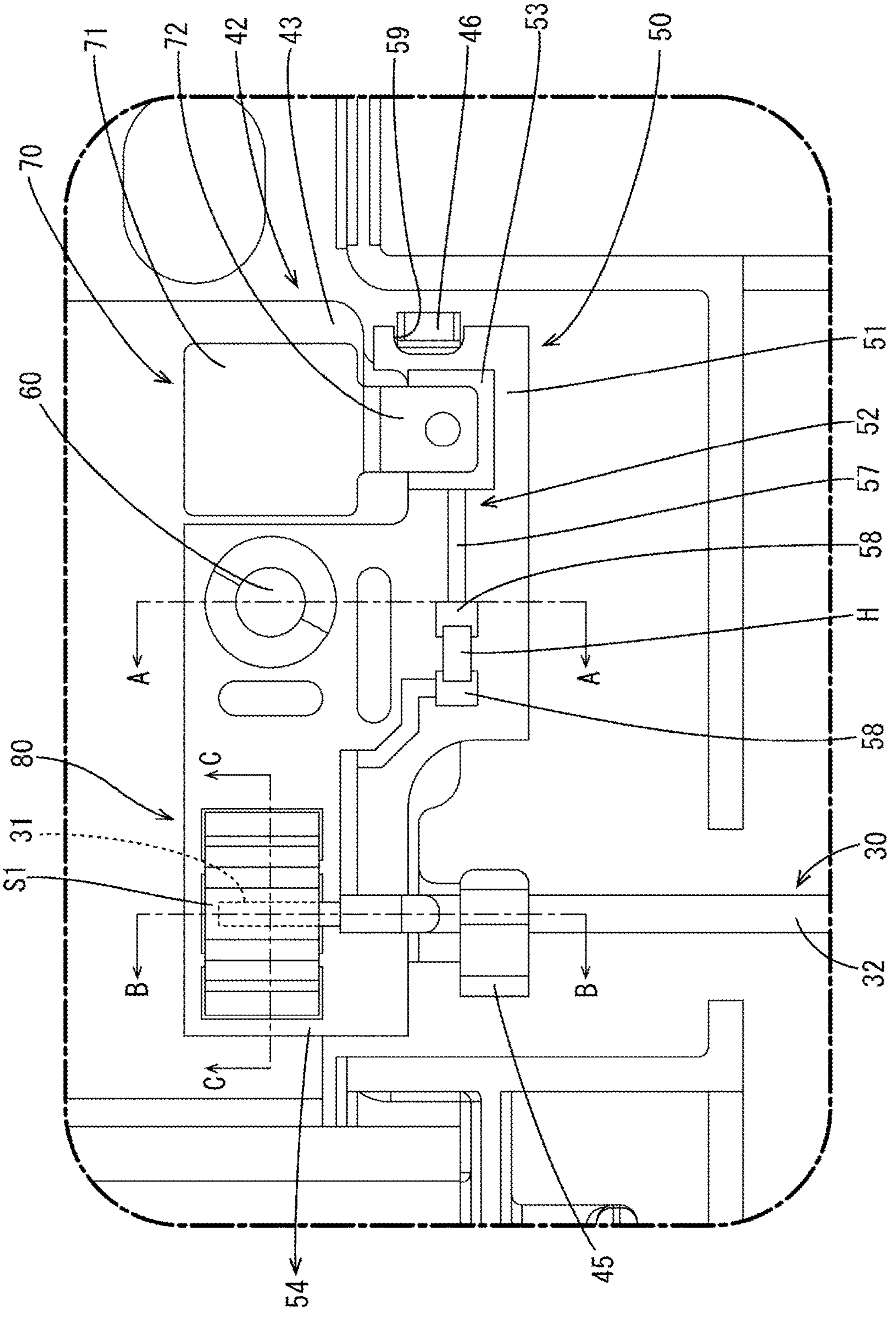
FIG. 2 is a partially enlarged plan view illustrating the vicinity of a circuit board of a wiring module of Embodiment 1.
Figure 3:
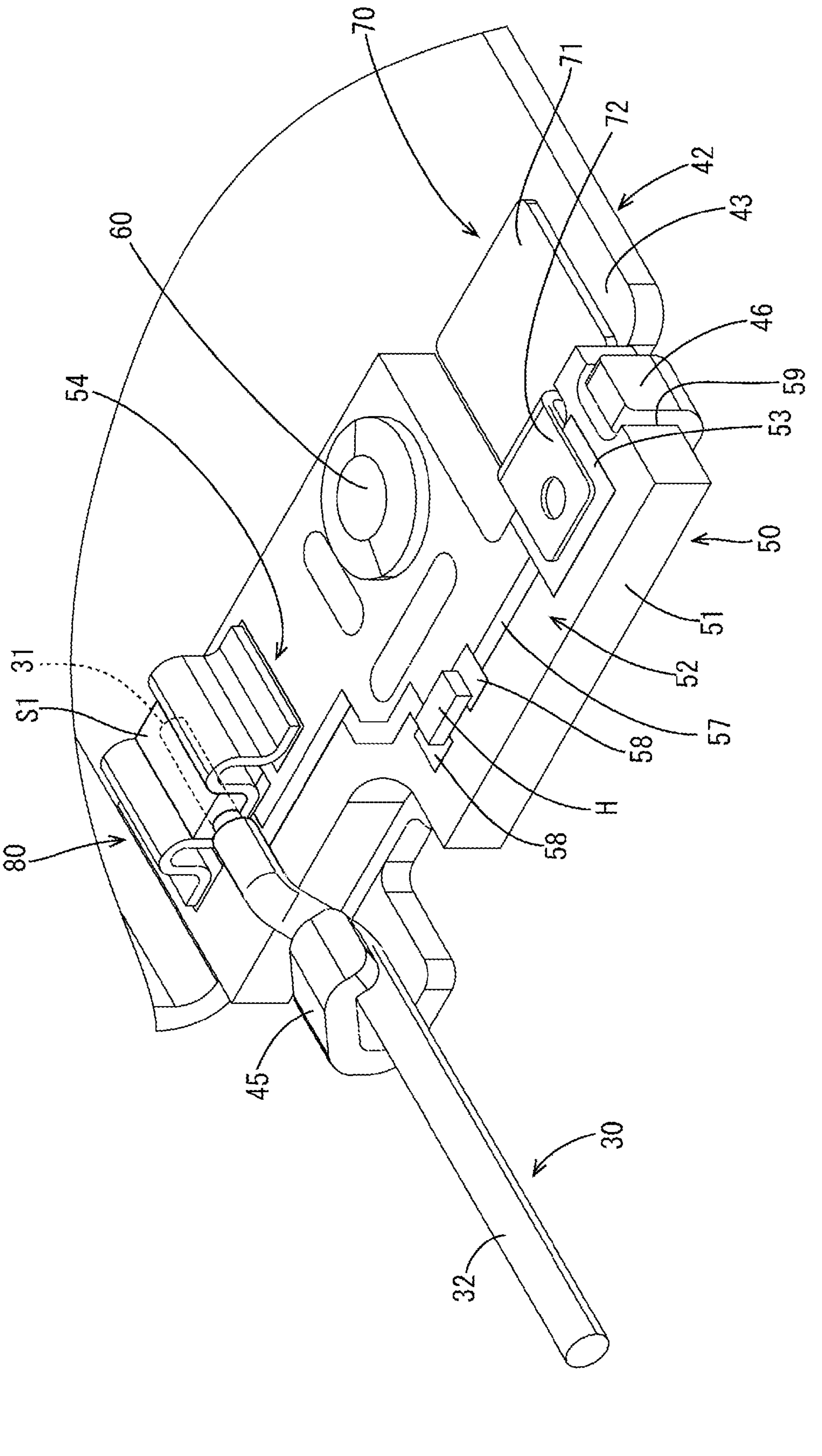
FIG. 3 is a partially enlarged perspective view illustrating the vicinity of a circuit board of the wiring module of Embodiment 1.

As shown in FIGS. 2 and 3, the wire 30 includes a core wire 31 and an insulating coating 32 that is made of a synthetic resin and encloses the outer circumference of the core wire 31. The core wire 31 is, for example, a single core wire made of a metal and is conductive. Examples of the material of the core wire 31 include copper, a copper alloy, aluminum, and an aluminum alloy. At one end of the wire 30, the insulating coating 32 is stripped and the core wire 31 is exposed. The other end of the wire 30 is connected to, for example, an external ECU (Electronic Control Unit) via a connector. ECUs are units on which a microcomputer, elements and the like are mounted, and have a well-known configuration having functions of, for example, sensing voltages, currents, temperatures and the like of the power storage elements 10, controlling charging/discharging of the power storage elements 10, and the like.

Busbar 40

Figure 4:
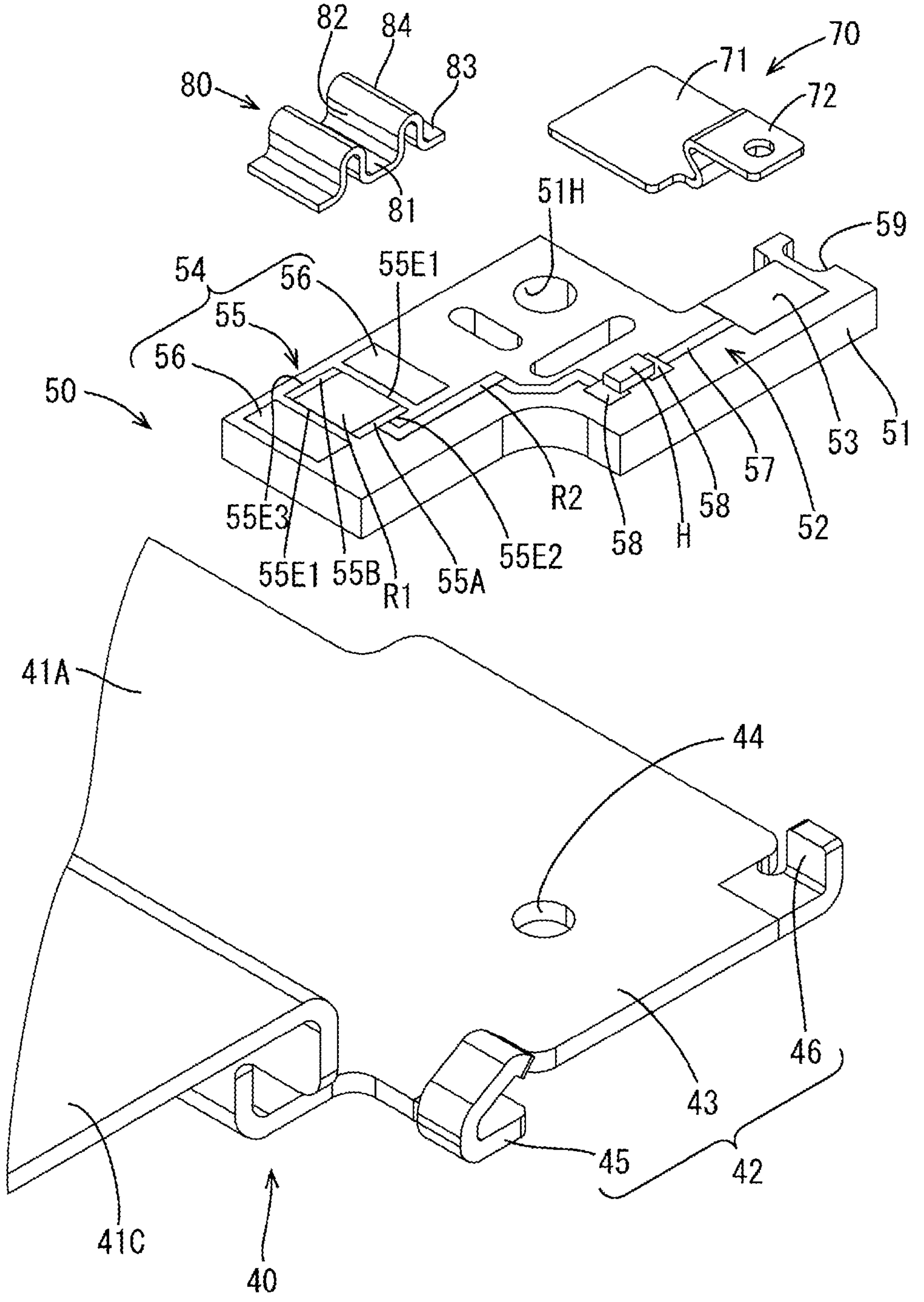
FIG. 4 is an enlarged exploded perspective view illustrating a board placement part, the circuit board, a busbar relay member, and a wire relay member of Embodiment 1.

The busbars 40 are made of a metal, and are conductive. Examples of the material of the busbars 40 include copper, a copper alloy, aluminum, an aluminum alloy, and stainless steel (SUS). As shown in FIGS. 1 and 4, each busbar 40 includes a busbar main body 41 that connects the positive electrode terminal 11A of one power storage element 10 and the negative electrode terminal 11B of another power storage element 10 adjacent to the one power storage element 10, and a board placement part 42 that is contiguous to the busbar main body 41 and to which the corresponding circuit board 50 is fixed.

As shown in FIG. 1, the busbar main body 41 includes a first electrode connection part 41A that is plate-shaped and is laid on one of the electrode terminals 11A and 11B, a second electrode connection part 41B that is plate-shaped and is laid on the other electrode terminal, and a coupling part 41C that couples the first electrode connection part 41A and the second electrode connection part 41B. The first electrode connection part 41A and the second electrode connection part 41B are respectively connected to the electrode terminals 11A and 11B by, for example, laser welding.

As shown in FIG. 4, the board placement part 42 includes a board support part 43 that is contiguous to the first electrode connection part 41A and supports the circuit board 50, a wire holding part 45 that is contiguous to the board support part 43 and holds the wire 30, and a positioning projection 46 that extends from the board support part 43 and positions the circuit board 50. The board placement part 42 is plate-shaped, and has a first fixation hole 44. The first fixation hole 44 is a through hole through which the rivet 60 is passed. The wire holding part 45 is U-shaped as a whole, and is capable of receiving the wire 30 inside the U shaped portion. The positioning projection 46 is a plate piece extending vertically with respect to the board support part 43.

Circuit Board 50

As shown in FIGS. 2, 3 and 4, the circuit board 50 includes an insulating plate 51, and a conductive path 52 disposed on one face of the insulating plate 51. The insulating plate 51 is a hard plate made of, for example, a glass fabric base epoxy resin, and is insulating. The conductive path 52 is made of, for example, a conductive metal such as copper or a copper alloy, and is formed using printed wiring technique. The conductive path 52 includes a first land 53 connected to the busbar 40 via a busbar relay member 70, a second land 54 connected to the wire 30 via a wire relay member 80, and a main line 57 connecting the first land 53 and the second land 54.

As shown in FIG. 4, the second land 54 is constituted by a connection land part 55, and two mounting land parts 56 arranged on both sides of the connection land part 55. The connection land part 55 and the two mounting land parts 56 are arranged at distances from each other.

The connection land part 55 has two side edges 55E1 adjacent to the two respective mounting land parts 56, and two end edges 55E2 and 55E3 that connect the two side edges 55E1 to each other. The main line 57 is connected to one end edge 55E2 of the connection land part 55, and the first land 53, the main line 57 and the connection land part 55 constitute a wiring that electrically connects the busbar 40 and the wire 30. Most part of the connection land part 55 except for portions extending along the two end edges 55E2 and 55E3 is covered with a resist R1. The portions of the connection land part 55 that extend along the two end edges 55E2 and 55E3 and are exposed from the resist R1 are defined as two exposed portions 55A and 55B. Part of the main line 57 that is adjacent to the exposed portion 55A is covered with a resist R2.

The mounting land parts 56 are lands for fixing the wire relay member 80 to the circuit board 50, and are disposed independently from the connection land part 55. The mounting land parts 56 are lands that are independent from the wiring for electrically connecting the busbar 40 to the wire 30, and to which neither voltage nor signal is applied.

A chip fuse H is connected to the conductive path 52 at a position between the first land 53 and the second land 54. The conductive path 52 includes two third lands 58 in midway positions of the main line 57, and two terminal portions of the chip fuse H are respectively connected to the two third lands 58 by soldering. Most part of the conductive path 52 except for the first land 53, the second land 54, and two third lands 58 is covered with an insulating film made of a synthetic resin.

The insulating plate 51 has a second fixation hole 51H and a positioning recess 59. The second fixation hole 51H is a through hole through which the rivet 60 is passed. The positioning recess 59 is a recess that is recessed from the outer edge of the insulating plate 51, and is capable of receiving the positioning projection 46. As a result of the positioning projection 46 being received inside the positioning recess 59, the circuit board 50 is positioned with respect to the board support part 43.

Rivet 60

Figure 5:
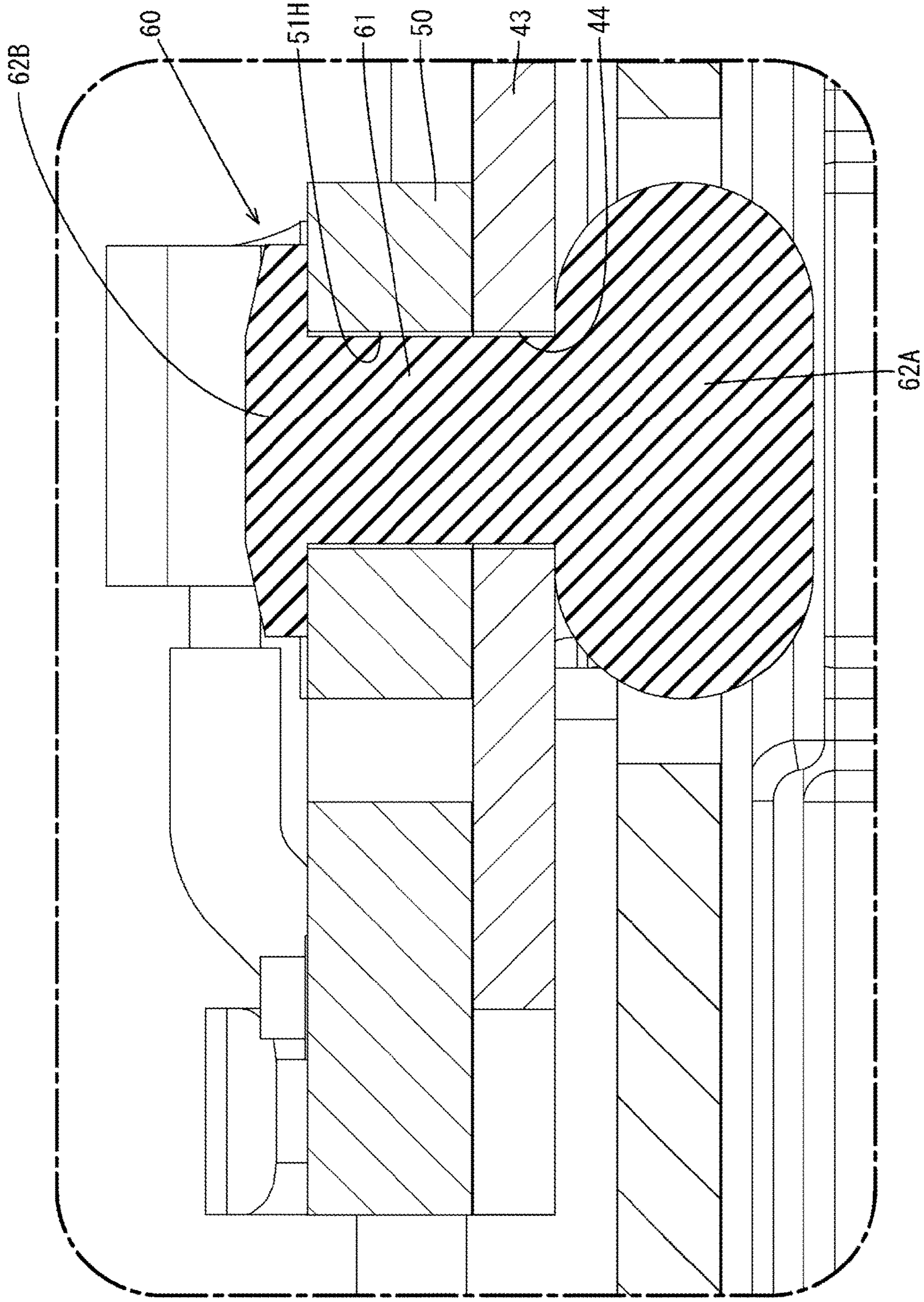
FIG. 5 is a cross-sectional view taken along a line A-A in FIG. 2.

The rivet 60 is made of a metal, and includes, as shown in FIG. 5, a shaft portion 61 inserted into the first fixation hole 44 and the second fixation hole 51H, and two head portions 62A and 62B that are formed at both ends of the shaft portion 61 and have diameters greater than the hole diameters of the first fixation hole 44 and the second fixation hole 51H. The circuit board 50 is laid to overlap the board support part 43, the shaft portion 61 is inserted into the first fixation hole 44 and the second fixation hole 51H, and the two head portions 62A and 62B are arranged with part of the board support part 43 around the first fixation hole 44 and part of the board support part 50 around the second fixation hole 51H interposed therebetween. With this, the circuit board 50 is fixed to the board support part 43.

Busbar Relay Member 70

The busbar relay member 70 is a conductive plate material made of a metal, and has, as shown in FIGS. 2 and 4, one end portion serving as a busbar connection part 71, and another end portion serving as a land connection part 72. The busbar connection part 71 is connected to the busbar 40 by welding, for example. The land connection part 72 is connected to the first land 53 by soldering.

Wire Relay Member 80

Figure 6:
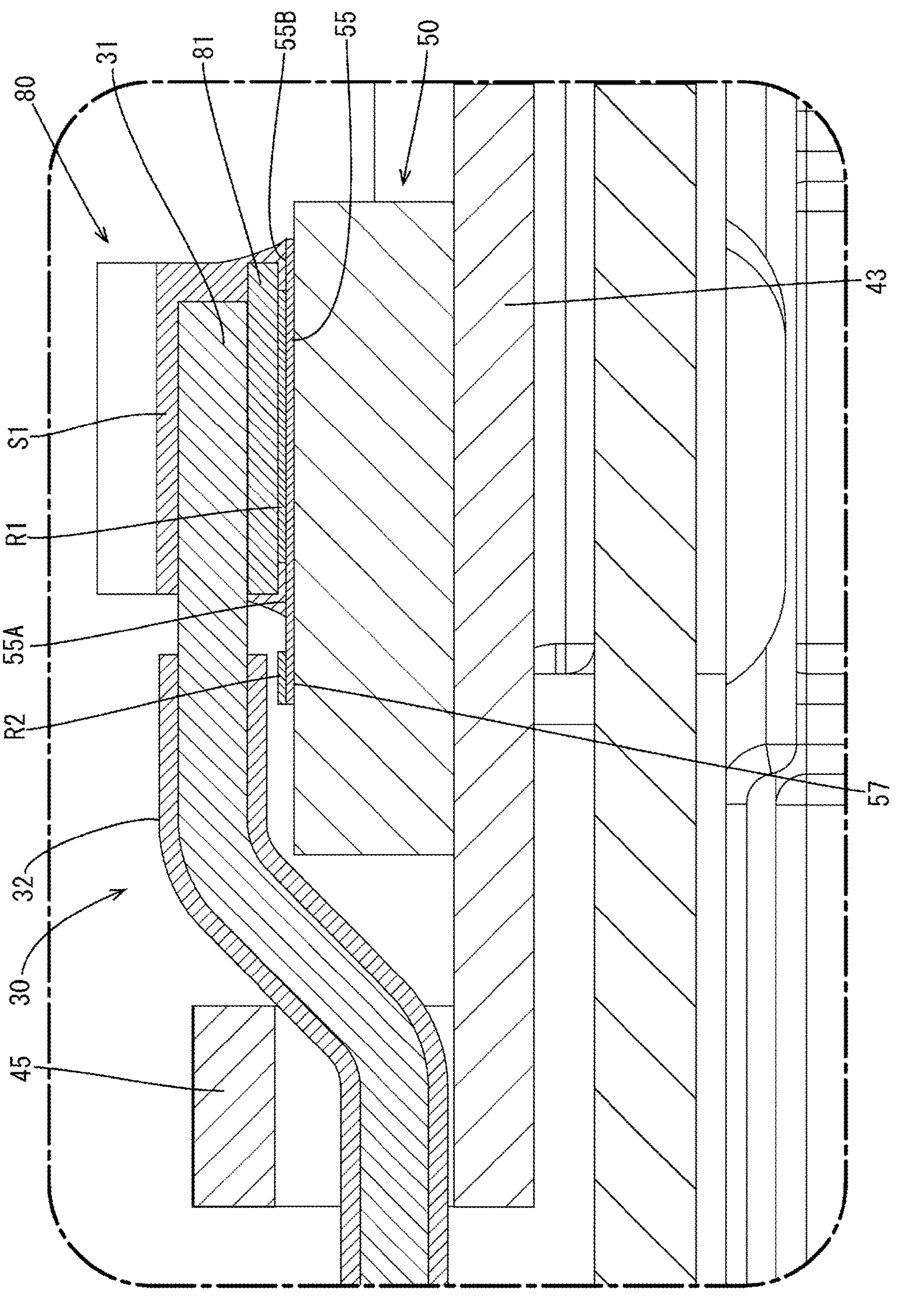
FIG. 6 is a cross-sectional view taken along a line B-B in FIG. 2.
Figure 7:
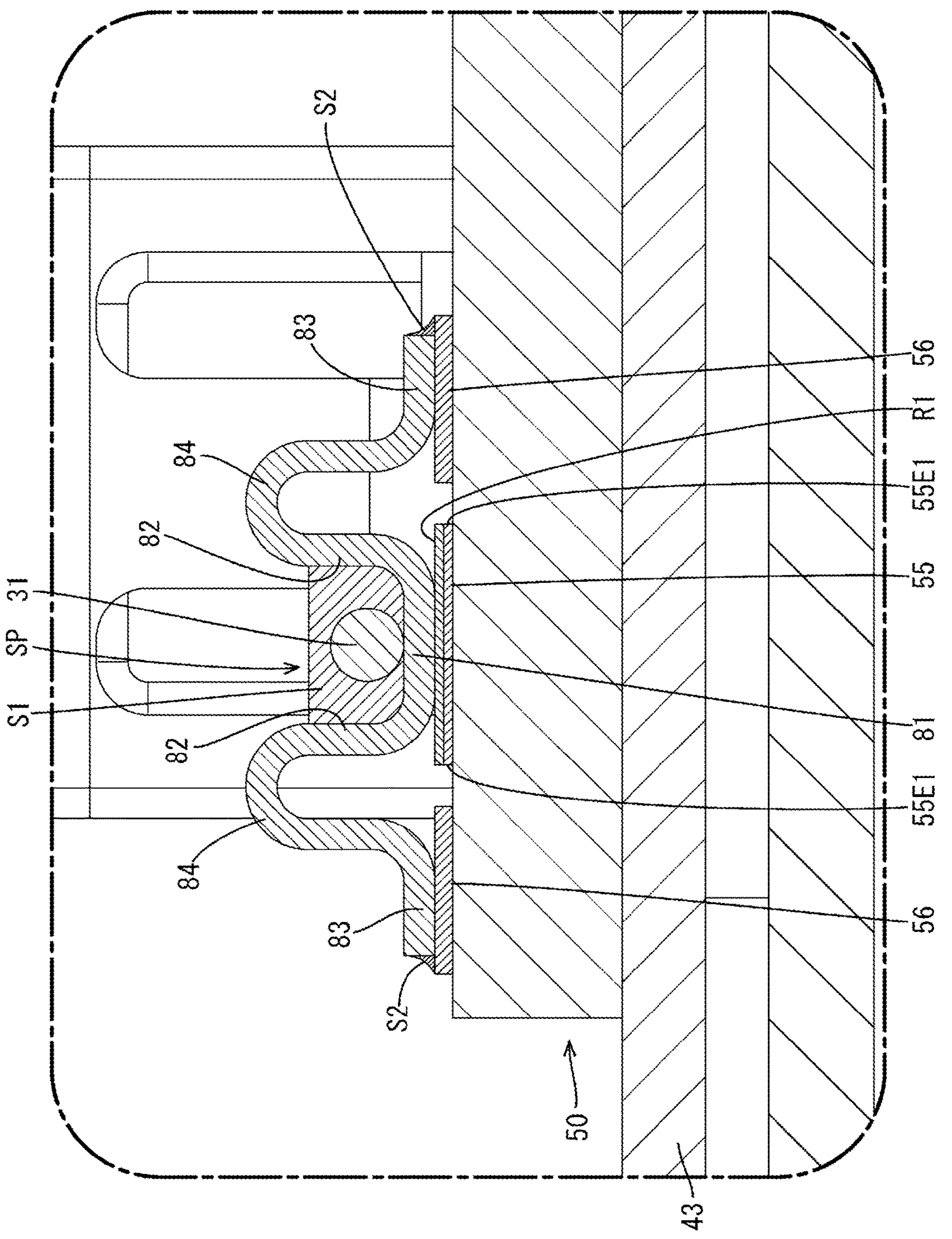
FIG. 7 is a cross-sectional view taken along a line C-C in FIG. 2.

The wire relay member 80 is made of a conductive metal, and includes, as shown in FIGS. 4, 6, and 7, a core wire connection part 81 connected to the core wire 31 and the connection land part 55, two partitioning walls 82, two mounting parts 83 respectively connected to the two mounting land parts 56, and two coupling parts 84 respectively connecting the two partitioning walls 82 to the two mounting parts 83. The core wire connection part 81 has a rectangular plate shape. The two partitioning walls 82 respectively extend from the two side edges of the core wire connection part 81, and face each other. Each coupling part 84 is a J-shaped wall that extends from the extended end of the corresponding partitioning wall 82 in an arch shape, and then extends parallel to the partitioning wall 82. Each mounting part 83 is plate-shaped, and extends from the extended end of the corresponding coupling part 84 outward (in a direction moving away from the core wire connection part 81).

As shown in FIGS. 6 and 7, the core wire 31 exposed from the insulating coating 32 at a terminal part of the wire 30 is placed on the core wire connection part 81, and the core wire 31 is connected to the core wire connection part 81 by soldering. In the following description, a solder that connects the core wire 31 to the core wire connection part 81 is referred to as a first solder S1. The first solder S1 is disposed in a space Sp of the wire relay member 80 that is surrounded by the core wire connection part 81 and the two partitioning walls 82, and the core wire 31 is embedded in the first solder S1. The first solder S1 is disposed with a certain degree of thickness between the two partitioning walls 82, and the core wire 31 is embedded in the first solder S1. With this, the core wire 31 is reliably embedded in the first solder S1, so that the core wire 31 is covered with the first solder S1 over the entire circumference.

The wire relay member 80 is disposed on the second land 54 in a manner such that the core wire connection part 81 overlaps the connection land part 55, and the two mounting parts 83 respectively overlap the two mounting land parts 56. The core wire connection part 81 is connected to the two exposed portions 55A and 55B of the connection land part 55 with the first solder S1. Since the core wire 31 and the core wire connection part 81 are connected to each other with the first solder S1, and the core wire connection part 81 and the connection land part 55 are connected to each other with the first solder S1, the wire 30 is connected to the conductive path 52 via the wire relay member 80. Also, the two mounting parts 83 are respectively connected to the two mounting land parts 56 by soldering. With this, the wire relay member 80 is fixed to the circuit board 50. The solder that connects the mounting parts 83 to the mounting land parts 56 is a second solder S2, which has a composition different from that of the first solder S1. Since the first solder S1 and the second solder S2 have different compositions, they are preferably in a state in which they are not mixed with each other, that is, they are not in contact with each other. This is to avoid a reduction in connection reliability. In the present embodiment, the mounting land parts 56 are lands for fixing the wire relay member 80 to the circuit board 50, and are independent from the wiring of the conductive path 52 for electrically connecting the busbar 40 to the wire 30, without involving in electrical connection between the core wire 31 and the busbar 40. As a result of the mounting land parts 56 being disposed independently from the connection land part 55, it is possible to rigidly fix the wire relay member 80 to the circuit board 50, while avoiding the first solder S1 and the second solder S2, which have different compositions, from being mixed with each other to inversely affect the electrical connection.

Also, the wire relay member 80 is disposed in a manner such that the two partitioning walls 82 are directed to a direction along the two side edges 55E1 of the connection land part 55 that face the two respective mounting land parts 56. The space Sp in which the first solder S1 is disposed is separated by the partitioning walls 82 from the mounting land parts 56 to which the mounting parts 83 are connected with the second solders S2. With this, it is possible to reliably avoid the first solder S1 and the second solder S2 from being mixed with each other and adversely affecting the electrical connection.

Holding Member 90

The holding member 90 is made of a synthetic resin, and includes a busbar holding part 91 that holds the plurality of busbars 40, and a wire routing part 92 in which the wires 30 are routed.

Method for Manufacturing Power Storage Module 1

The following will describe an example of a method for manufacturing the power storage module 1 having the above-described configuration.

First, the circuit board 50 is manufactured using a printed wiring technique. Then, the second solders S2 are applied to the first land 53, the mounting land parts 56, and the third lands 58 of the circuit board 50, and the land connection part 72, the mounting parts 83, and the chip fuse H are connected, by reflow soldering, to the first land 53, the mounting land parts 56, and the third lands 58, respectively. At this time, the second solder S2 is not applied to the connection land part 55, so that the connection land part 55 and the core wire connection part 81 are not connected to each other with the second solder S2.

Then, the circuit board 50 to which the wire relay member 80, the busbar relay member 70 and the chip fuse H are connected is placed on the board support part 43. At this time, the positioning projection 46 is received inside the positioning recess 59, and the circuit board 50 is thus positioned. In this state, the circuit board 50 is fixed to the board placement part 42 by the rivet 60. The rivet 60 before fixation does not have any head portion 62B, and by inserting the shaft portion 61 through the first fixation hole 44 and the second fixation hole 51H, and then punching the leading end portion of the shaft portion 61, the head portion 62B is formed. Subsequently, the busbar connection part 71 is connected to the busbar 40 by welding. With this, the busbar 40 and the first land 53 are electrically connected to each other via the busbar relay member 70.

Then, the plurality of busbars 40 to each of which the circuit board 50 is fixed are set in the busbar holding part 91 of the holding member 90. Then, the wires 30 are routed in the wire routing part 92 of the holding member 90, and the core wire 31 exposed at a terminal part of each wire 30 is placed on the corresponding core wire connection part 81. The part of the wire 30 that is covered with the insulating coating 32 and is adjacent to the exposed portion of the core wire 31 is inserted into and held by the corresponding wire holding part 45. In this state, using, for example, a robot soldering apparatus, the core wire 31 and the core wire connection part 81 are connected to each other with the first solder S1, and the core wire connection part 81 and the connection land part 55 are connected to each other with the first solder S1. With this, the manufacturing of the wiring module 20 is complete.

Eventually, the wiring module 20 is disposed on the plurality of power storage elements 10, and the busbars 40 are connected to the electrode terminals 11A and 11B by laser welding. With this, the manufacturing of the power storage module 1 is complete.

Operational Effects

As described above, according to the present embodiment, a wiring module 20 includes: a wire 30 with a core wire 31; a wire relay member 80 connected to the core wire 31; a busbar 40 configured to be connected to the electrode terminals 11A, 11B; and a circuit board 50 provided with a conductive path 52, the conductive path 52 including a first land 53 electrically connected to the busbar 40 and a second land 54 electrically connected to the wire relay member 80, wherein the second land 54 includes a connection land part 55, and a mounting land part 56 disposed at a distance from the connection land part 55, and the wire relay member 80 includes a core wire connection part 81 connected to the core wire 31 and the connection land part 55 with a first solder S1, and a mounting part 83 connected to the mounting land part 56 with a second solder S2, which is different from the first solder S1.

With the above-described configuration, by connecting the core wire 31 to the second land 54 via the wire relay member 80, the degree of freedom in design for improving the connection strength is increased compared to a case where the core wire is directly connected to the land, resulting in an improvement in the connection reliability of the wire 30. Also, the second land 54 connected to the wire relay member 80 includes the connection land part 55, and the mounting land part 56 disposed at a distance from the connection land part 55, and the wire relay member 80 includes the core wire connection part 81 connected to the core wire 31 and the connection land part 55 with the first solder S1, and the mounting part 83 connected to the mounting land part 56 with the second solder S2, which is different from the first solder S1. This can avoid the first solder S1 and the second solder S2, which have different compositions, from being mixed with each other and adversely affecting the electrical connection, making it possible to improve the connection reliability of the wire.

Also, the wire relay member 80 includes a partitioning wall 82 that stands upright from the core wire connection part 81 and separates a space Sp adjacent to the core wire connection part 81 from the mounting land part 56, and the first solder S1 is disposed in the space Sp. With this configuration, it is possible to reliably avoid the first solder S1 and the second solder S2 from being mixed with each other and adversely affecting the electrical connection.

Embodiment 2

The following describes Embodiment 2 with reference to FIGS. 8 to 12. The present embodiment differs from Embodiment 1 in the configuration of a second land 112 included in a circuit board 110, and the configuration of a wire relay member 120. In the present embodiment, the same reference numerals are given to the same configurations as those in Embodiment 1, and descriptions thereof are omitted.

Figure 8:
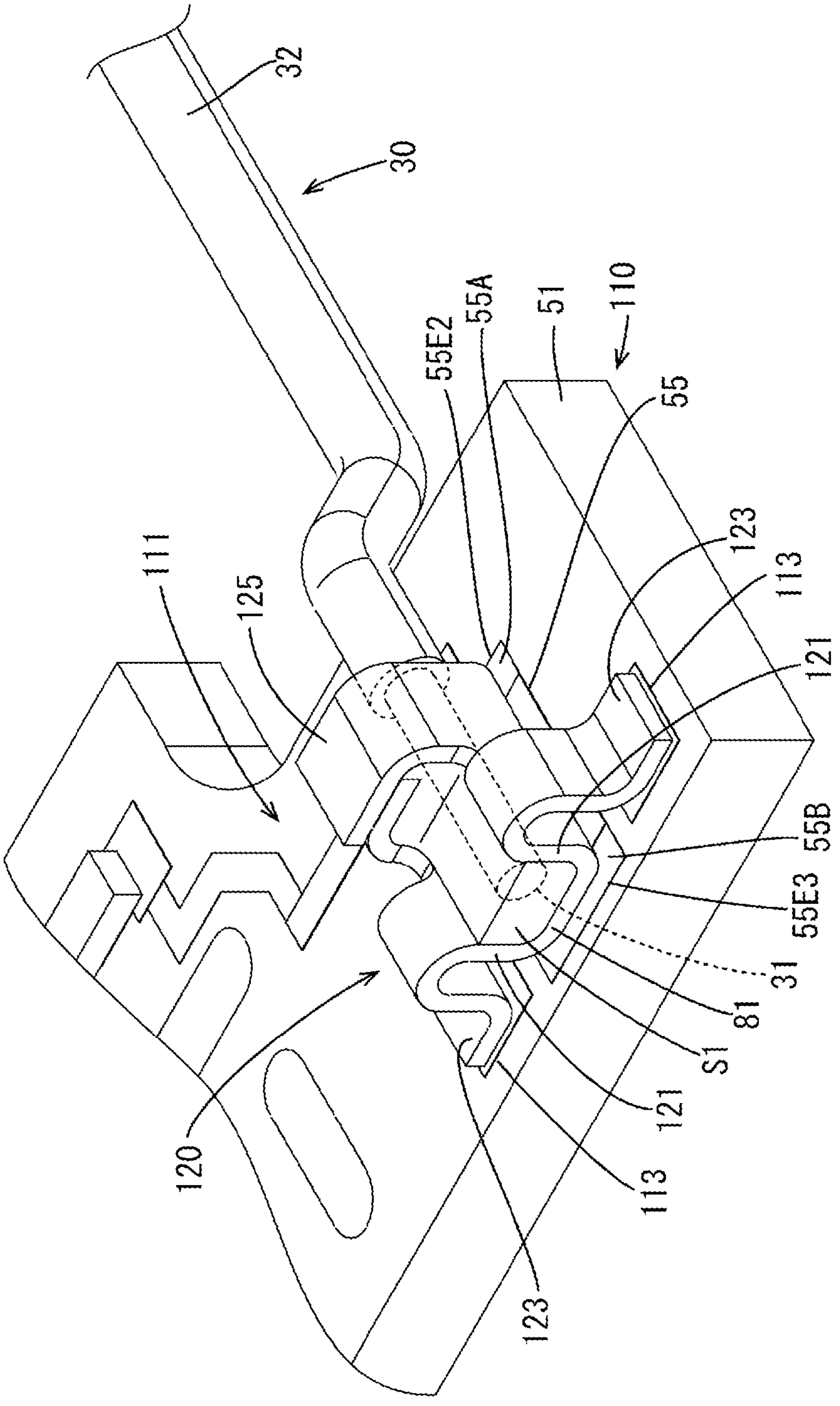
FIG. 8 is a partially enlarged perspective view illustrating the vicinity of a wire relay member of a wiring module of Embodiment 2.
Figure 9:
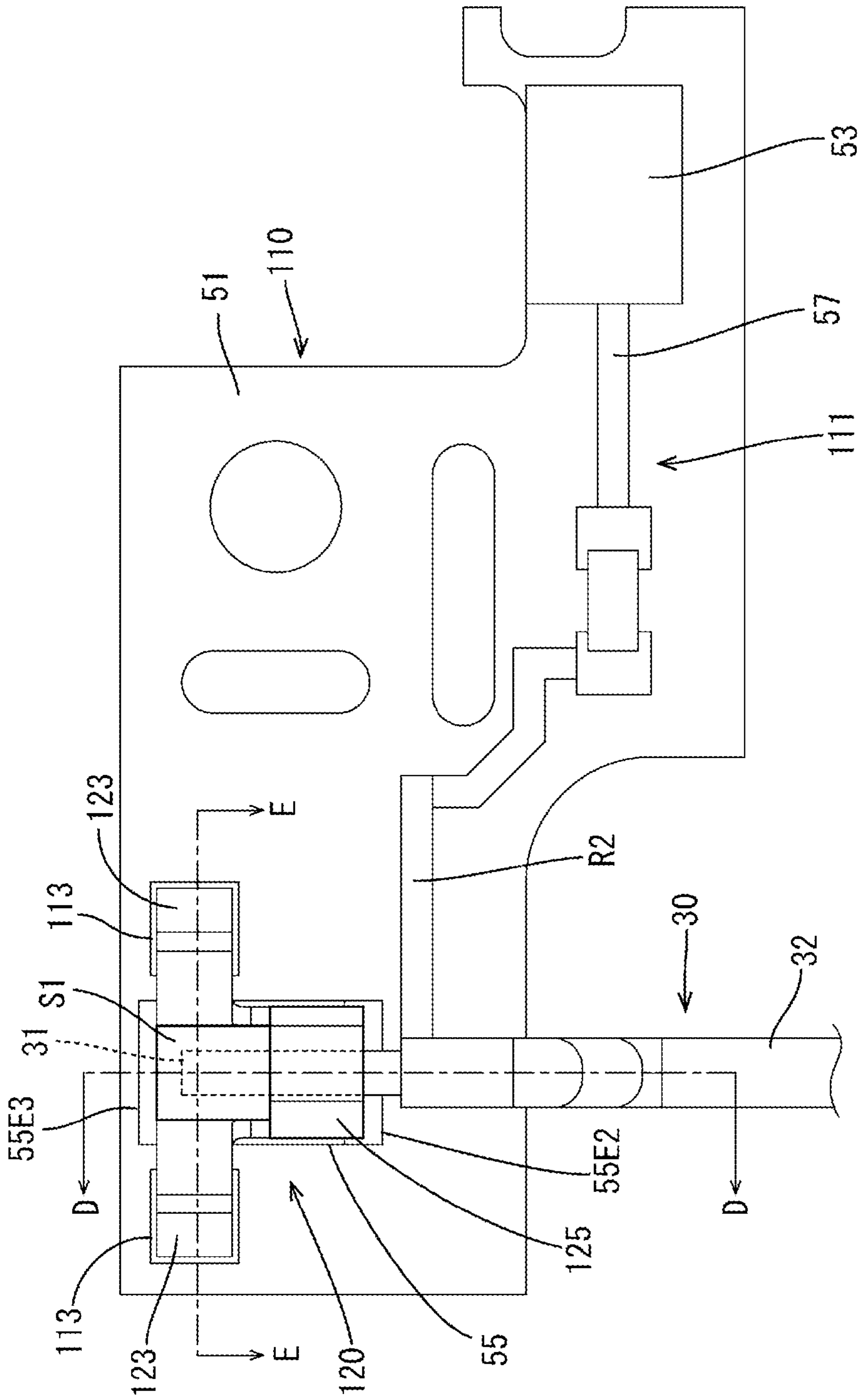
FIG. 9 is a plan view illustrating a circuit board and the wire relay member of Embodiment 2.
Figure 10:
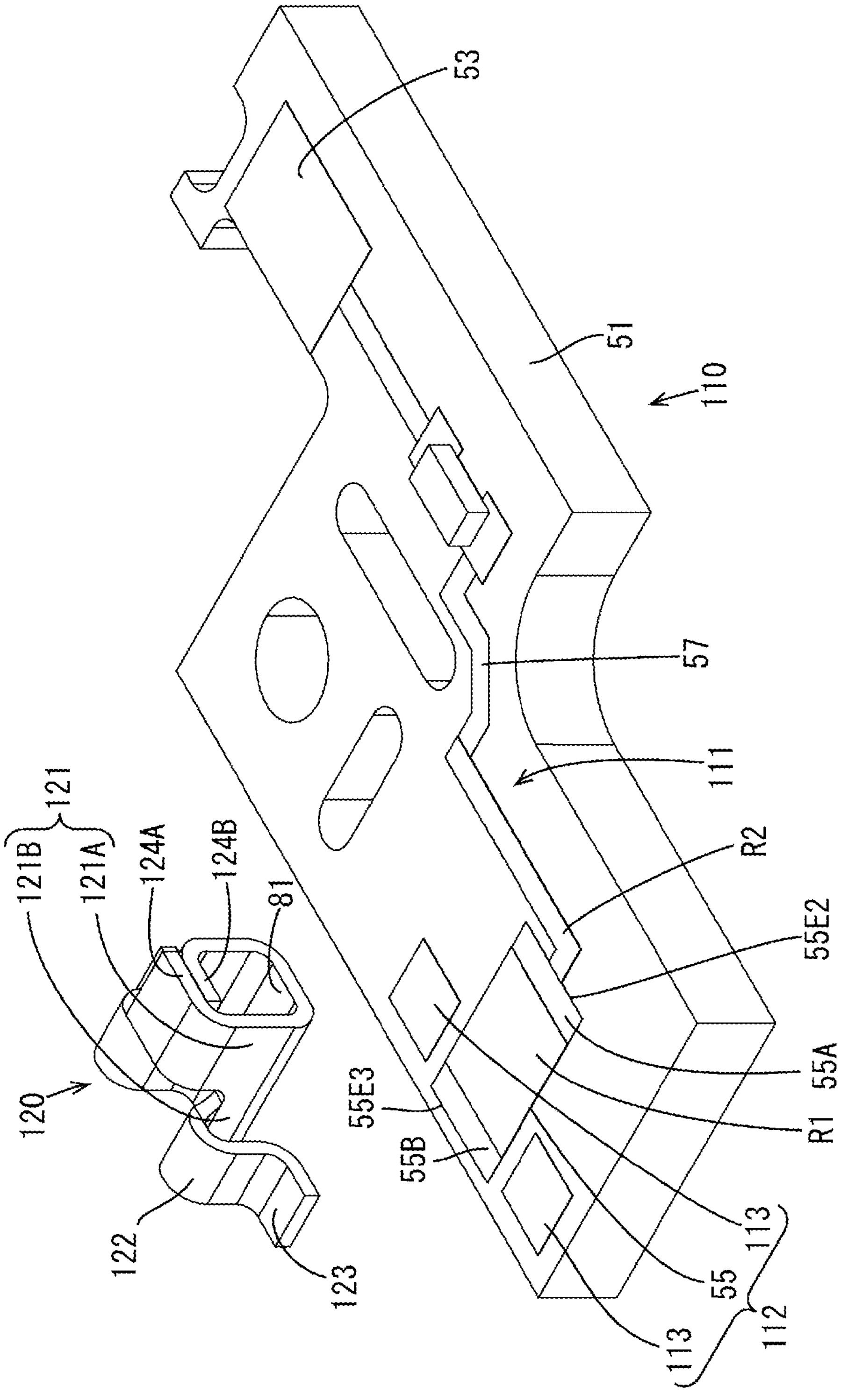
FIG. 10 is an exploded perspective view illustrating the circuit board and the wire relay member of Embodiment 2.

As shown in FIGS. 8, 9 and 10, the circuit board 110 includes the insulating plate 51, and a conductive path 111 disposed on one face of the insulating plate 51. As shown in FIG. 10, the conductive path 111 includes the main line 57, the first land 53, and the second land 112. The second land 112 is constituted by the connection land part 55, and two mounting land parts 113 arranged on both sides of the connection land part 55. The mounting land parts 113 are lands for fixing the wire relay member 120 to the circuit board 50, and are disposed independently from the connection land part 55. The two mounting land parts 113 have a rectangular shape smaller than that of the connection land part 55, and are disposed at positions closer to the other end edge 55E3 of the connection land part 55 than the one end edge 55E2.

Figure 11:
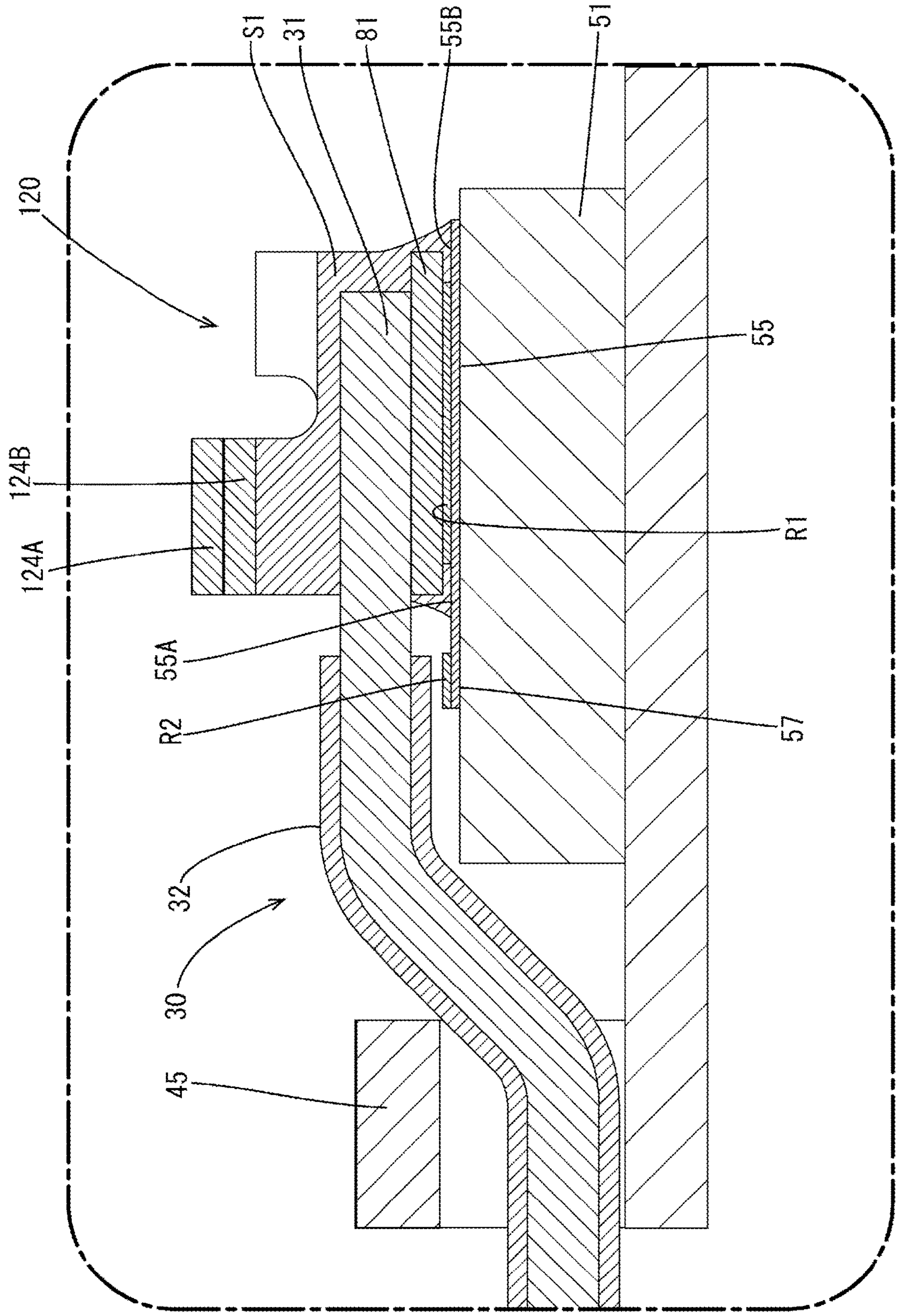
FIG. 11 is a cross-sectional view taken along a line D-D in FIG. 9.
Figure 12:
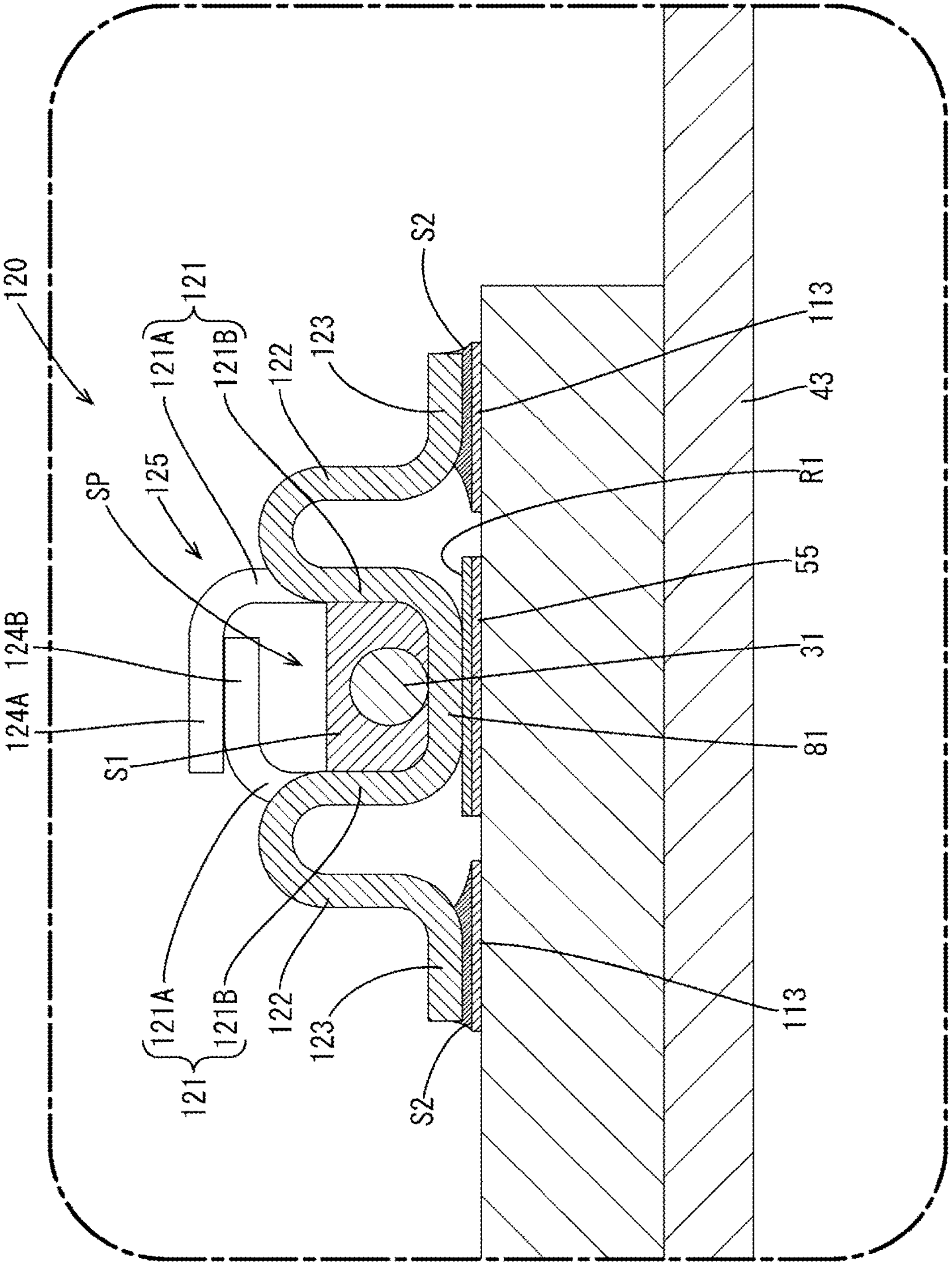
FIG. 12 is a cross-sectional view taken along a line E-E in FIG. 9.

The wire relay member 120 is made of a conductive metal, and includes, as shown in FIGS. 10, 11 and 12, the core wire connection part 81 connected to the core wire 31 and the connection land part 55, two partitioning walls 121, two mounting parts 123 respectively connected to the two mounting land parts 113, two coupling parts 122 respectively connecting the two partitioning walls 121 to the two mounting parts 123, and top walls 124A and 124B that extends from the two respective partitioning walls 121 and face the core wire connection part 81.

The two partitioning walls 121 respectively extend from the two side edges of the core wire connection part 81, and face each other. One half of each partitioning wall 121 that is adjacent to an end of the core wire connection part 81 is defined as a high-wall portion 121A, and the remaining half is defined as a low-wall portion 121B, which is lower than the high-wall portion 121A. One top wall 124A extends from one of the two high-wall portions 121A to the other, and the other top wall 124B extends from the other of the two high-wall portions 121A to the one. The two top walls 124A and 124B overlap each other. The two coupling parts 122 are J-shaped in a manner such that they extend from the respective two low-wall portions 121B in an arch shape, and then extend parallel to the low-wall portions 121B. The two mounting parts 123 respectively extend from the extended ends of the two coupling parts 122 outward (in a direction moving away from the core wire connection part 81). The core wire connection part 81, the two high-wall portions 121A, and the top walls 124A and 124B constitute a square tubular tube part 125.

As shown in FIGS. 11 and 12, the core wire 31 exposed from the insulating coating 32 at a terminal part of the wire 30 is placed on the core wire connection part 81, and the core wire 31 is connected to the core wire connection part 81 with the first solder S1. The first solder S1 is disposed in a space Sp of the wire relay member 80 that is surrounded by the core wire connection part 81 and the two partitioning walls 121, and the core wire 31 is embedded in the first solder S1. The first solder S1 is disposed with a certain degree of thickness between the two partitioning walls 121, and the core wire 31 is embedded in the first solder S1. With this, the core wire 31 is reliably embedded in the first solder S1, so that the core wire 31 is covered with the first solder S1 over the entire circumference. Particularly, the wire relay member 120 has the tube part 125, and the tube part 125 is filled with the first solder S1. With this, the core wire 31 is reliably embedded in the first solder S1, so that the core wire 31 is covered with the first solder S1 over the entire circumference.

As shown in FIGS. 8, 11 and 12, the wire relay member 120 is disposed on the second land 112 in a manner such that the core wire connection part 81 overlaps the connection land part 55, and the two mounting parts 123 respectively overlap the two mounting land parts 113. As shown in FIGS. 8 and 9, the wire relay member 120 is disposed in an orientation in which the tube part 125 is directed toward the end edge 55E2. As shown in FIG. 11, the core wire connection part 81 is connected to the two exposed portions 55A and 55B of the connection land part 55 with the first solder S1. With this, the core wire 31, the wire relay member 120 and the conductive path 111 are electrically connected to each other. As shown in FIG. 12, the two mounting parts 123 are respectively connected to the two mounting land parts 113 with the second solder S2. With this, the wire relay member 120 is fixed to the circuit board 110.

Also in the present embodiment, the same operational effects as those in Embodiment 1 are achieved. Also, in the present embodiment, the wire relay member 120 has the tube part 125, and a larger amount of the first solder S1 is placed inside the tube part 125. The tube part 125 is located on one end edge 55E2 side of the connection land part 55, and the mounting land part 113 and the mounting part 123 connected to each other with the second solder S2 are located on the other end edge 55E3 side opposite to the tube part 125. With this, it is possible to reliably avoid the first solder S1 and the second solder S2 from being mixed with each other and adversely affecting the electrical connection.

Embodiment 3

The following describes Embodiment 2 with reference to FIGS. 13 to 17. The present embodiment is common with Embodiment 2 in the configuration of the wire relay member 120, but differs from Embodiments 1 and 2 in the configuration of a second land 132 included in a circuit board 130. In the present embodiment, the same reference numerals are given to the same configurations as those in the above-described embodiments, and descriptions thereof are omitted.

Figure 13:
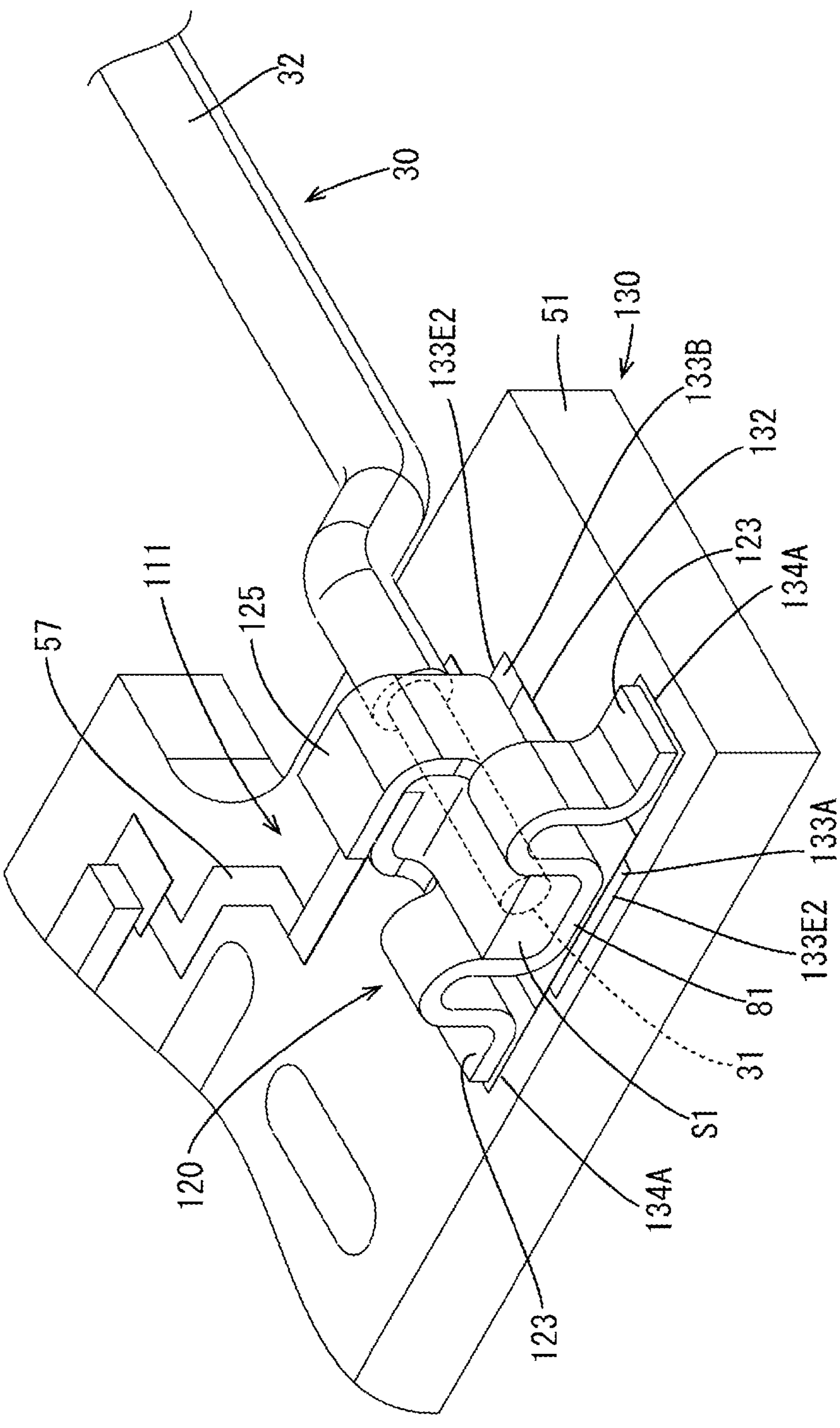
FIG. 13 is a partially enlarged perspective view illustrating the vicinity of a wire relay member of a wiring module of Embodiment 3.
Figure 14:
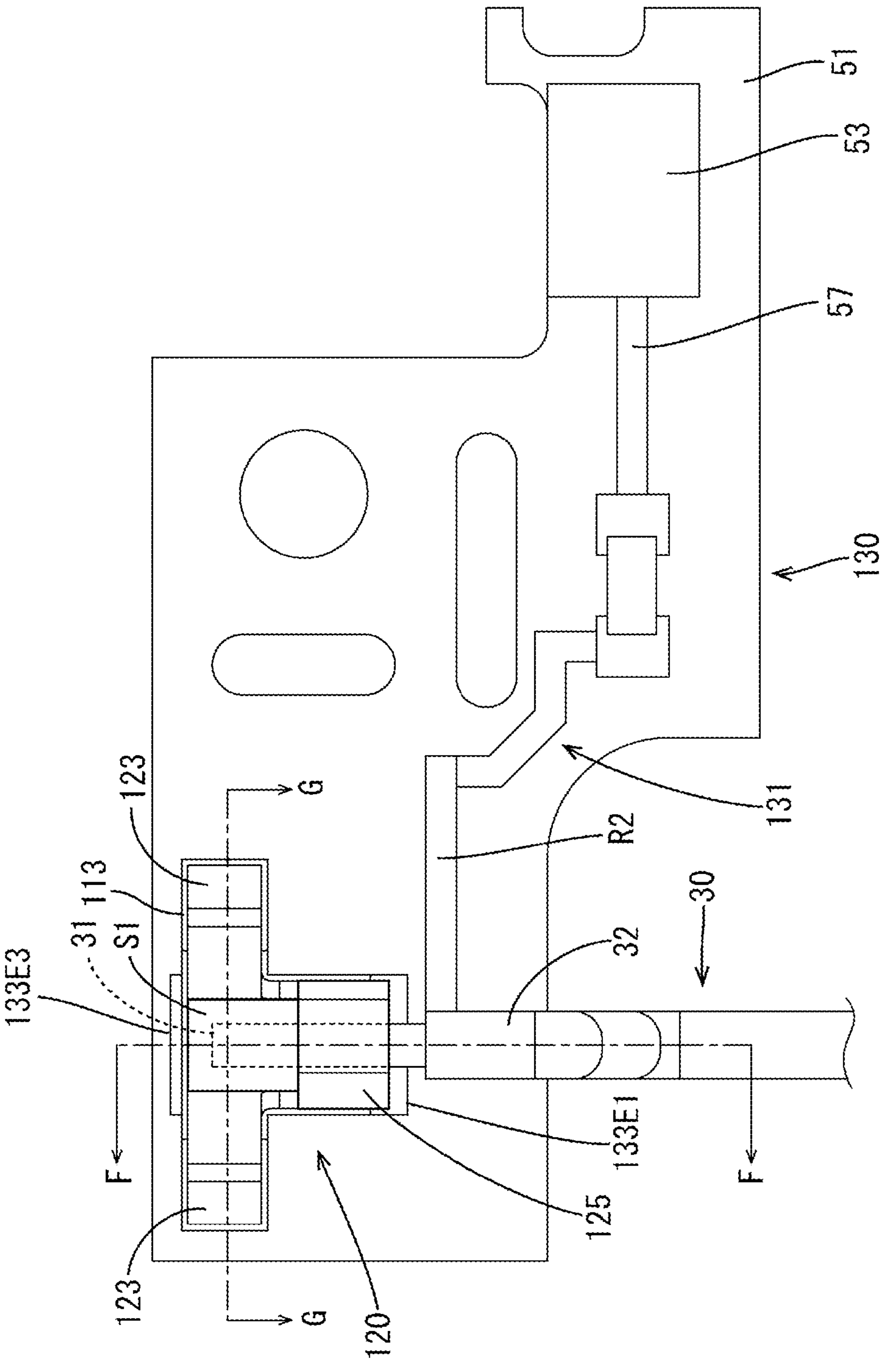
FIG. 14 is a plan view illustrating a circuit board and the wire relay member of Embodiment 3.
Figure 15:
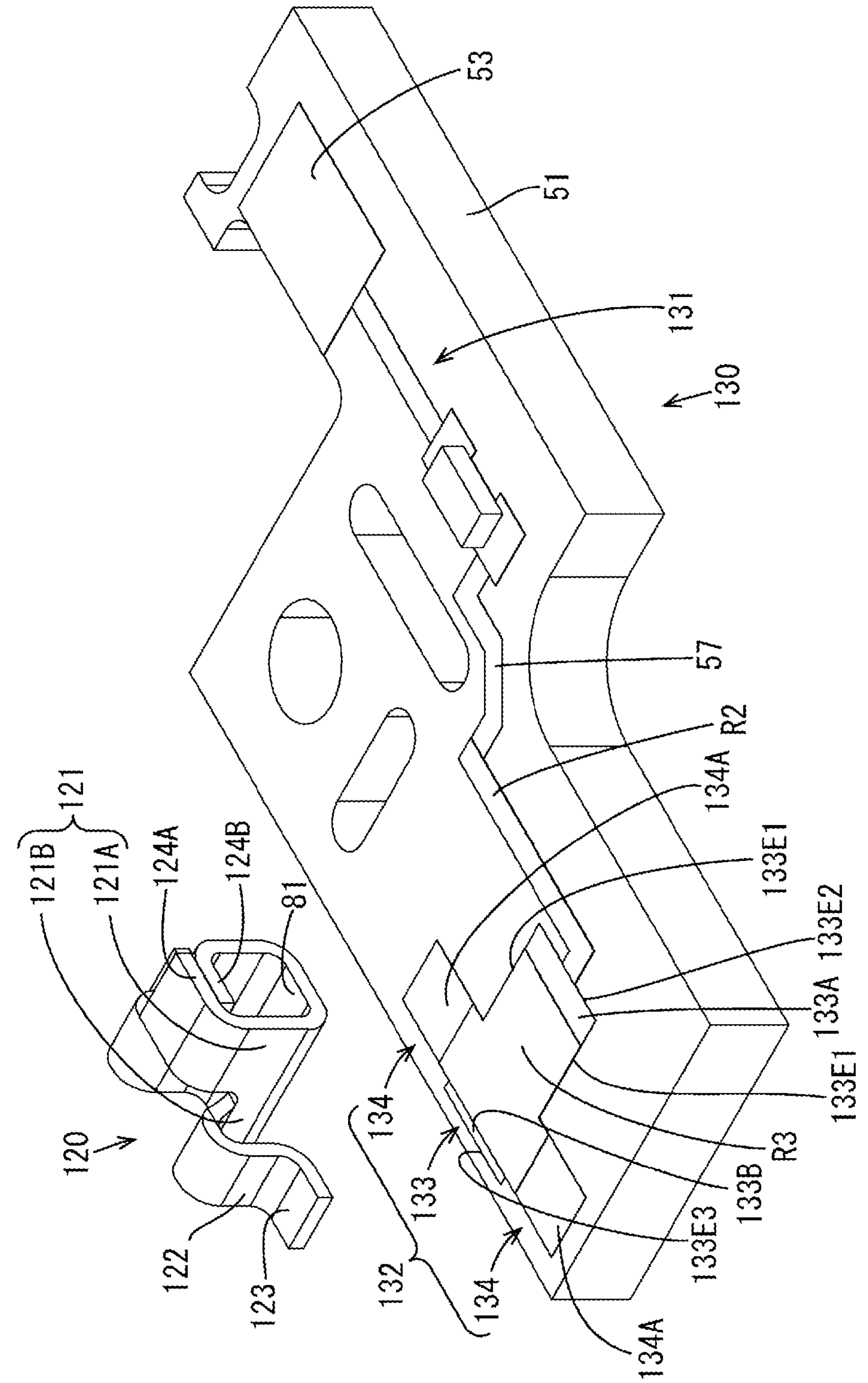
FIG. 15 is an exploded perspective view illustrating the circuit board and the wire relay member of Embodiment 3.

As shown in FIGS. 13, 14 and 15, the circuit board 130 includes the insulating plate 51, and a conductive path 131 disposed on one face of the insulating plate 51. As shown in FIG. 15, the conductive path 131 includes the main line 57, the first land 53, and the second land 132.

The second land 132 includes a rectangular main portion 133, and two extended portions 134 extending from the main portion 133. The main portion 133 has two side edges 133E1, and two end edges 133E2 and 133E3 that connect the two side edges 133E1 to each other. The two extended portions 134 respectively extend from the two side edges 133E1 and are disposed with the main portion 133 interposed therebetween. Most part of the second land 132 except for parts extending along the two end edges 133E2 and 133E3 of the main portion 133, and parts of the two extended portions 134 that are adjacent to the main portion 133 are covered with a resist R3. The parts of the main portion 133 that extend along the two end edges 133E2 and 133E3 and are exposed from the resist R3 are respectively defined as the connection land parts 133A and 133B. The portions of the two extended portions 134 except for the parts thereof adjacent to the main portion 133 and exposed from the resist R3 are defined as two mounting land parts 134A. That is to say, the connection land parts 133A and 133B and the mounting land part 134A are separated by the resist R3 and distanced from each other. The main line 57 is connected to one end edge 133E2 of the main portion 133, and the second land 132, the main line 57 and the first land 53 constitute a wiring that electrically connects the busbar 40 and the wire 30. The two mounting land parts 134A are disposed at positions closer to the other end edge 133E3 of the main portion 133 than the one end edge 133E2.

Figure 16:
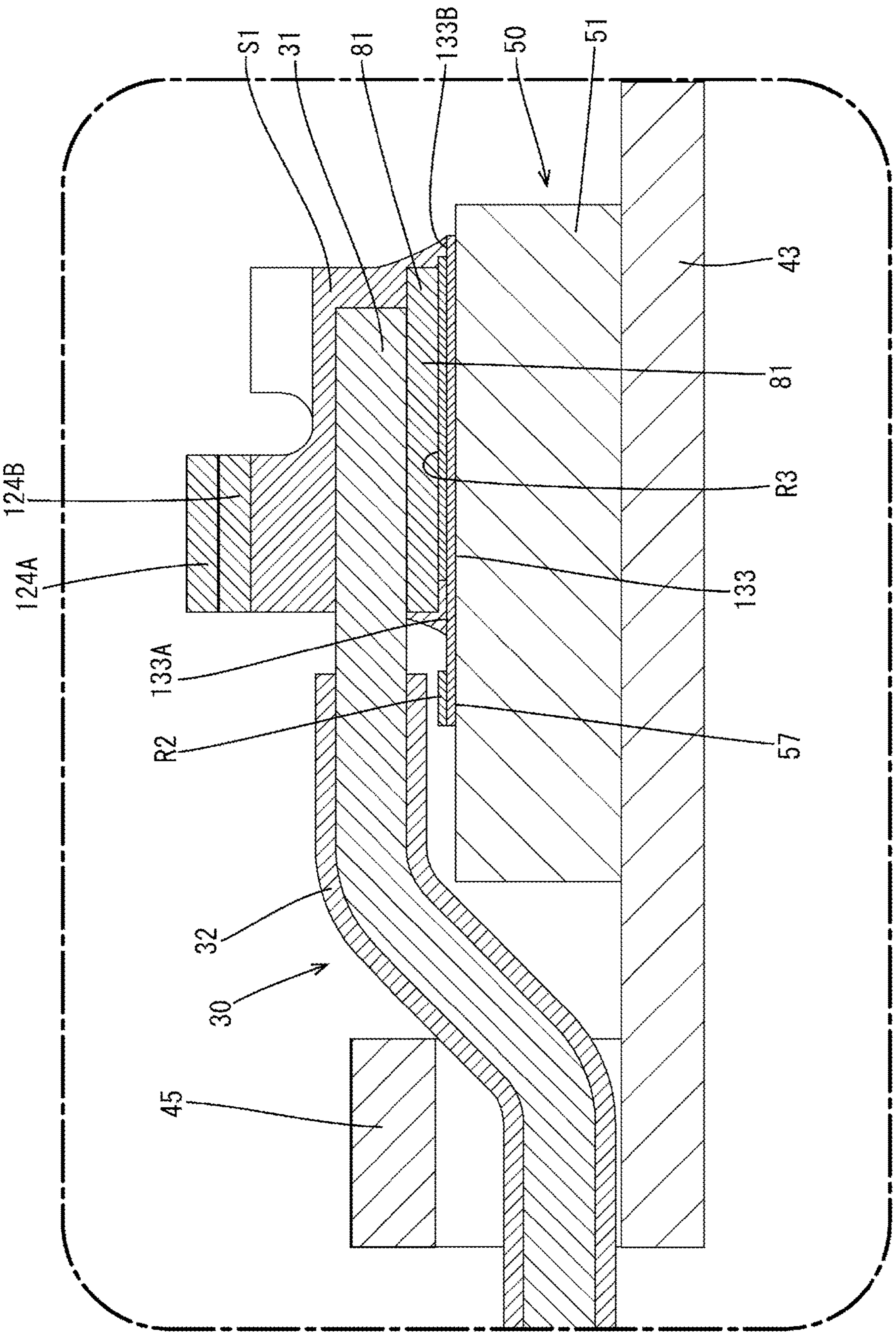
FIG. 16 is a cross-sectional view taken along a line F-F in FIG. 14.
Figure 17:
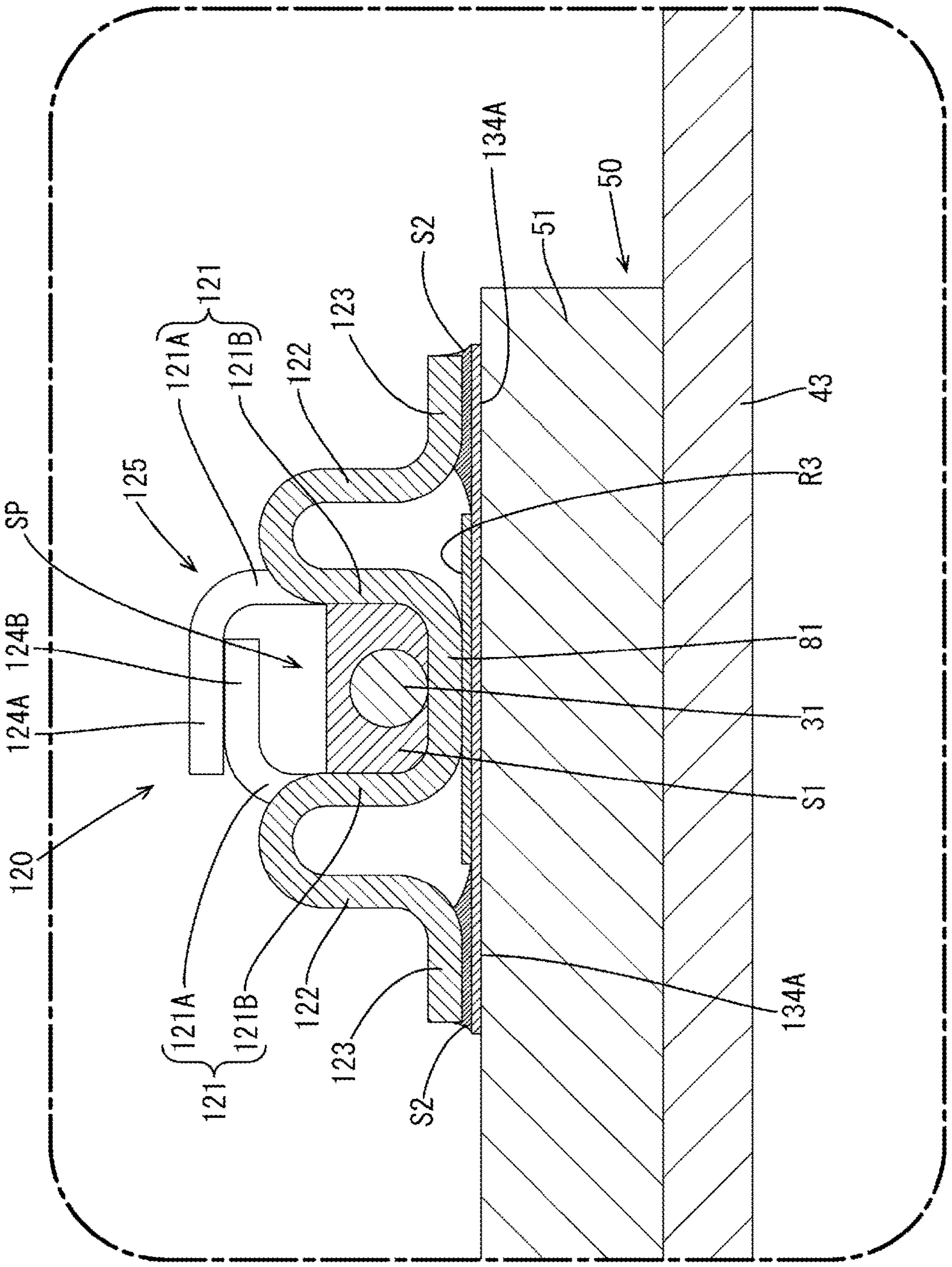
FIG. 17 is a cross-sectional view taken along a line G-G in FIG. 14.

The core wire 31 is connected to the wire relay member 120, as in Embodiment 2. As shown in FIGS. 13, 16 and 17, the wire relay member 120 is disposed on the second land 132 in a manner such that the core wire connection part 81 overlaps the connection land parts 133A and 133B, and the two mounting parts 123 respectively overlap the two mounting land parts 134A. The wire relay member 120 is disposed in an orientation in which the tube part 125 is directed toward the one end edge 133E2. As shown in FIG. 16, the core wire connection part 81 is connected to the connection land parts 133A and 133B with the first solder S1. With this, the core wire 31, the wire relay member 120 and the conductive path 131 are electrically connected to each other. As shown in FIG. 17, the two mounting parts 123 are respectively connected to the two mounting land parts 134A with the second solder S2. With this, the wire relay member 120 is fixed to the circuit board 130.

Also in the present embodiment, the second land 132 connected to the wire relay member 120 includes the connection land part 133A, 133B and the mounting land part 134A disposed at a distance from the connection land part 133A, 133B, and the wire relay member 120 includes the core wire connection part 81 connected to the core wire 31 and the connection land part 133A, 133B with the first solder S1, and the mounting part 123 connected to the mounting land part 134A with the second solder S2, which is different from the first solder S1. With this, it is possible to reliably avoid the first solder S1 and the second solder S2, which have different compositions, from mixing with each other and adversely affecting the electrical connection.

OTHER EMBODIMENTS (1) In Embodiments 1 and 2 above, part of the connection land part 55 is covered with the resist R1, but if the mounting land part is disposed independently from the connection land part, the connection land part does not need to be covered with a resist.

(2) In the above-described embodiments, the second land 54, 112, 132 includes two mounting land parts 56, 113, 136, and the wire relay member 80, 120 includes two mounting parts 83, 123, but the number of the mounting land parts and the number of mounting parts may be arbitrary, and may be one, or three or more.

LIST OF REFERENCE NUMERALS

1: Power storage module
10: Power storage element
11A: Positive electrode terminal (electrode terminal)
11B: Negative electrode terminal (electrode terminal)
20: Wiring module
30: Wire
31: Core wire
32: Insulating coating
40: Busbar
41: Busbar main body
41A: First electrode connection part
41B: Second electrode connection part
41C: Coupling part
42: Board placement part
43: Board support part
44: First fixation hole
45: Wire holding part
46: Positioning projection
50, 110, 130: Circuit board
51: Insulating plate
51H: Second fixation hole
52, 111, 131: Conductive path
53: First land
54, 112, 132: Second land
55, 133A, 133B: Connection land
55A, 55B: Exposed portion
55E1: Side edge
55E2, 55E3: End edge
56, 113, 134A: Mounting land part
57: Main line
58: Third land
59: Positioning recess
60: Rivet
61: Shaft portion
62A, 62B: Head portion
70: Busbar relay member
71: Busbar connection part
72: Land connection part
120: Wire relay member
81: Core wire connection part
82, 121: Partitioning wall
83, 123: mounting part
84, 122: Coupling part
90: Holding member
91: Busbar holding part
92: Wire routing part
121A: High-wall portion
121B: Low-wall portion
124A. 124B: Top wall
125: Tube part
133: Main portion
133A. 133B: Connection land part
133E1: Side edge
133E2, 133E3: End edge
134: Extended portion
H: Chip fuse
R1. R2. R3: Resist
S1: First solder S2: Second solder Sp: Space

The invention claimed is:

1. A wiring module configured to be attached to a plurality of power storage elements having electrode terminals, the wiring module comprising:

a wire with a core wire;

a wire relay member connected to the core wire;

a busbar configured to be connected to the electrode terminals; and a circuit board provided with a conductive path, the conductive path including a first land electrically connected to the busbar and a second land electrically connected to the wire relay member, wherein the second land includes a connection land part, and a mounting land part disposed at a distance from the connection land part, and the wire relay member includes a core wire connection part connected to the core wire and the connection land part with a first solder, and a mounting part connected to the mounting land part with a second solder, which is different from the first solder.

2. The wiring module according to claim 1, wherein the mounting land part is disposed independently from the connection land part.

3. The wiring module according to claim 1, wherein the circuit board includes a resist that partially covers the second land, and the connection land part and the mounting land part are separated from each other by the resist.

4. The wiring module according to claim 2, wherein the wire relay member includes a partitioning wall that stands upright from the core wire connection part and separates a space adjacent to the core wire connection part from the mounting land part, and the first solder is disposed inside the space.

5. The wiring module according to claim 3, wherein the wire relay member includes a partitioning wall that stands upright from the core wire connection part and separates a space adjacent to the core wire connection part from the mounting land part, and the first solder is disposed inside the space.

6. The wiring module according to claim 1, wherein the wire relay member includes a partitioning wall that stands upright from the core wire connection part and separates a space adjacent to the core wire connection part from the mounting land part, and the first solder is disposed inside the space.

* * * * *